US008448329B2

(12) United States Patent
Rice et al.

(10) Patent No.: US 8,448,329 B2
(45) Date of Patent: May 28, 2013

(54) METHOD OF MANUFACTURING AN INTEGRATED LEAD HEAD SUSPENSION FLEXURE

(75) Inventors: Alexander J. Rice, Hutchinson, MN (US); Mark A. Miller, Hutchinson, MN (US); Gregory J. VanHecke, Dassel, MN (US); Lance Nevala, Tainan (TW)

(73) Assignee: Hutchinson Technology Incorporated, Hutchinson, MN (US)

( * ) Notice: Subject to any disclaimer, the term of this patent is extended or adjusted under 35 U.S.C. 154(b) by 117 days.

(21) Appl. No.: 12/876,867

(22) Filed: Sep. 7, 2010

(65) Prior Publication Data

US 2011/0000877 A1 Jan. 6, 2011

Related U.S. Application Data

(62) Division of application No. 11/627,521, filed on Jan. 26, 2007, now Pat. No. 7,813,082.

(51) Int. Cl.
*G11B 5/127* (2006.01)
*H04R 31/00* (2006.01)

(52) U.S. Cl.
USPC .................. 29/603.03; 29/603.04; 29/603.06; 29/603.07; 216/13; 216/39; 216/65

(58) Field of Classification Search
USPC ................ 29/603.03–603.07; 216/13, 39, 65; 360/234.5, 245.9; 451/5, 41
See application file for complete search history.

(56) References Cited

U.S. PATENT DOCUMENTS

| | | | | |
|---|---|---|---|---|
| 6,388,201 | B2 | 5/2002 | Yamato et al. | |
| 6,841,737 | B2 | 1/2005 | Komatsubara et al. | |
| 7,012,017 | B2 | 3/2006 | Brunner et al. | |
| 7,142,395 | B2 * | 11/2006 | Swanson et al. | 360/245.9 |
| 8,082,656 | B1 * | 12/2011 | Pokornowski et al. | 29/603.06 |
| 2003/0193753 | A1 | 10/2003 | Arai et al. | |
| 2005/0254175 | A1 | 11/2005 | Swanson et al. | |
| 2006/0044695 | A1 | 3/2006 | Erpelding | |
| 2007/0133128 | A1 | 6/2007 | Arai | |

OTHER PUBLICATIONS

Research Disclosure, Abstract, “Partial Etch or Channel Forming to Protect Trace and Reduce the Height”, Disclosed by International Business Machines Corporation, 41811, p. 284, Feb. 1999.

* cited by examiner

*Primary Examiner* — Paul D Kim
(74) *Attorney, Agent, or Firm* — Faegre Baker Daniels LLP

(57) ABSTRACT

An integrated lead head suspension flexure including a plurality of integrated leads each including at least one lead portion unbacked by the flexure spring metal layer and configured to be substantially inline with the general plane of the spring metal layer. The leads are disposed on a dielectric layer including an unbacked dielectric layer portion having a surface positioned between the major surfaces of the spring metal layer.

13 Claims, 6 Drawing Sheets

10
40
96
20
136
124

104
104
64
116
116
90
90
124
54
70
84
58
26
124
96
96
40
2
110
40
20
2
46
90
10
116
116
90
126

METHOD OF MANUFACTURING AN INTEGRATED LEAD HEAD SUSPENSION FLEXURE

CROSS-REFERENCE TO RELATED APPLICATION

This application is a division of U.S. patent application Ser. No. 11/627,521, filed Jan. 26, 2007 now U.S. Pat. No. 7,813,082, entitled HEAD SUSPENSION FLEXURE WITH INLINE LEAD PORTIONS, which application is incorporated herein by reference in its entirety and for all purposes.

FIELD OF THE INVENTION

The present invention relates generally to magnetic disk drive head suspensions. In particular, the present invention is a flexure including lead portions that are substantially inline with the flexure spring metal layer, and methods for making the flexure.

BACKGROUND OF THE INVENTION

Additive processes are known for manufacturing integrated lead head suspension flexures for magnetic disk drives. In such known processes, a flexure spring metal layer is formed from a stainless steel sheet of material. A patterned dielectric layer is then applied onto the spring metal layer, and conductive leads or traces are deposited onto the dielectric layer. Portions of the spring metal layer opposite the leads are subsequently etched away to form so-called "flying lead" portions that are not directly backed by the stainless steel spring metal layer.

There is a continuing need for improved disk drive head suspension flexures and methods for making such improved flexures. In particular, there is a need for a disk drive head suspension flexure exhibiting improved flexural characteristics and reduced stresses in its unbacked lead portions.

SUMMARY OF THE INVENTION

The present invention is an integrated lead head suspension flexure having improved flexural characteristics and reduced stresses in its unbacked lead portions, and a method for manufacturing the flexure. In the improved flexure, the unbacked lead portions are positioned substantially inline with the spring metal layer of the flexure. In one embodiment, the improved flexure comprises a spring metal layer having a first surface and a second surface opposite the first surface. The flexure further comprises a dielectric layer including a first dielectric portion on the spring metal layer and a second dielectric portion unbacked by the spring metal layer, and a plurality of conductive leads on the dielectric layer. Each lead includes a first lead portion on the first dielectric portion, and a second lead portion on the second dielectric portion. At least part of the second dielectric portion or part of the second lead portion is positioned between the first and second surfaces of the spring metal layer.

Another embodiment of the invention is a method for manufacturing the flexure. The method comprises forming a spring metal layer having a first surface and a second surface opposite the first surface, and forming at least one conductive lead on the flexure. The lead includes a first lead portion backed by the spring metal layer, and a second lead portion unbacked by the spring metal layer. At least one surface of the second lead portion is positioned between the first and second surfaces of the spring metal layer.

DETAILED DESCRIPTION OF THE PREFERRED EMBODIMENTS

Figure 1:
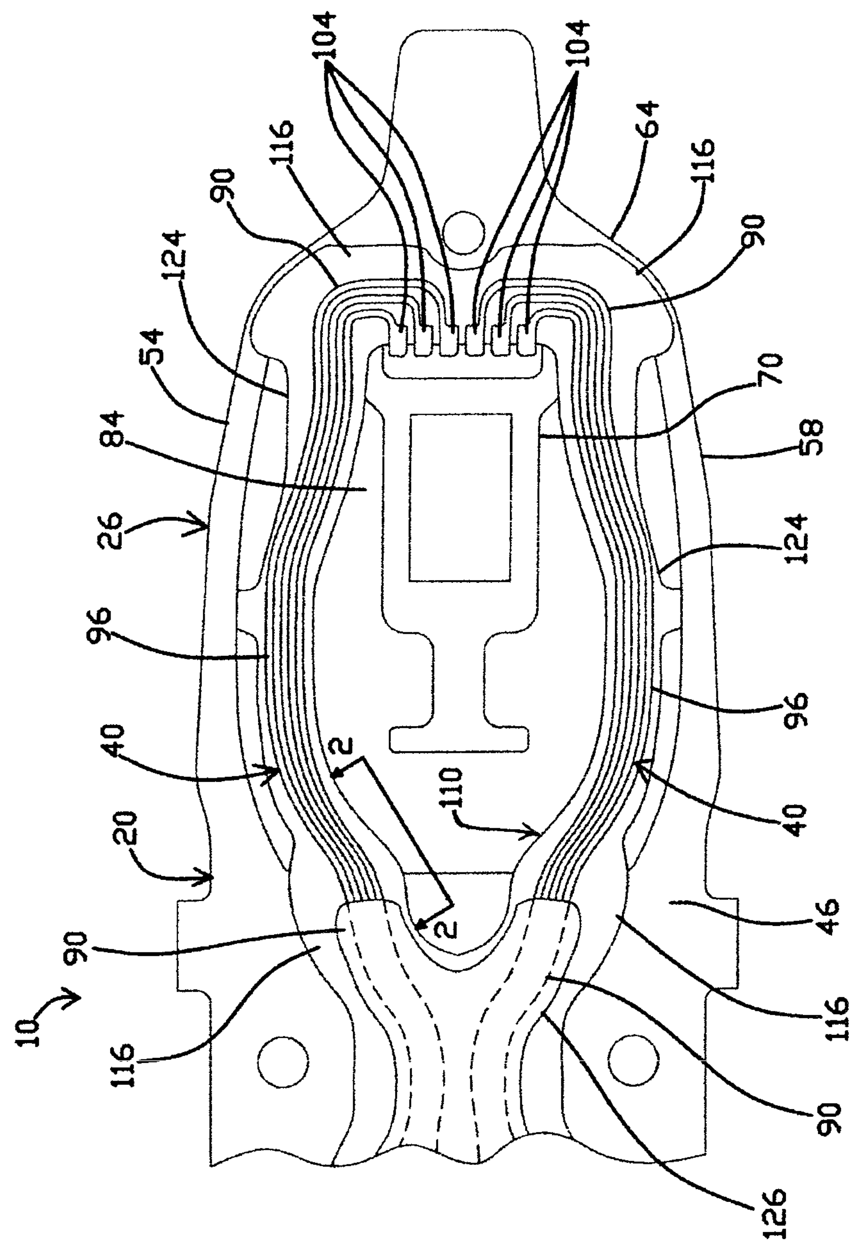
FIG. 1 is a plan view of a distal end portion of an integrated lead head suspension flexure having in-line lead portions according to one embodiment of the present invention.

FIG. 1 is a plan view of a distal end portion of an integrated lead head suspension flexure 10 according to one embodiment of the present invention. As shown, the flexure 10 includes a generally flat spring metal layer 20 including a gimbal region 26 in its distal end portion. As further shown, the flexure 10 includes a plurality of conductive traces or leads 40 overlaying portions of the spring metal layer 20.

As will be described and shown in detail below, portions of the leads 40 that are unbacked by (i.e., not overlaying) the spring metal layer 20 are, according to the various embodiments of the present invention, positioned so as to be substantially inline or co-planar with the general plane of the spring metal layer 20. This configuration advantageously locates the leads 40 more proximate the neutral axis of the spring metal layer 20 as compared to conventional flexures in which the leads are positioned significantly above the spring metal layer. As a result, bending stresses in the unbacked portions of the leads 40 are significantly lower than in flexures in which corresponding lead portions are positioned significantly above or below the neutral axis of the spring metal layer.

As will be appreciated, the spring metal layer 20 includes a proximal mounting region (not shown) configured for attachment to a load beam (not shown) of a disk drive head suspension. Such attachment may be effected by any techniques known in the art (e.g., welding). Additionally, as will further be appreciated, the leads are configured to be electrically coupled at or near their proximal regions (not shown) to other electronic components or test equipment. The spring metal layer 20 and leads 40 may assume, in various embodiments, a variety of shapes and sizes without departing from the scope of the present invention.

As shown in FIG. 1, the gimbal region 26 of the spring metal layer 20 includes a base region 46, a pair of lateral flexure arms 54, 58 extending distally from the base region 46, a cross member 64 extending between the distal ends of the flexure arms 54, 58, and a slider-receiving tongue 70 supported from the cross member 64. As further shown, the tongue 70 is separated from the flexure arms 54, 58 by a gap 84. The tongue 70 is configured to support a magnetic head slider (not shown) as is known in the art, and is designed to be resiliently moveable with respect to the remainder of the flexure 10 in response to aerodynamic forces exerted on the head slider during operation of the disk drive.

In the illustrated embodiment, each of the leads 40 includes one or more backed portions 90 and at least one unbacked portion 96 disposed in the gap 84. As can be seen in FIG. 1, the backed portions 90 of the leads 40 overlay the spring metal layer 20, while the unbacked portions 96 of the leads 40 do not overlay the spring metal layer 20. Additionally, each of the leads 40 terminates in a bond pad 104 located generally adjacent to the distal end of the tongue 70. The bond pads 104 operate to electrically couple the leads 40 to the head slider (not shown). Accordingly, the bond pads 104 may be configured to accept an attachment structure (e.g., a gold ball or solder ball) for electrically coupling the respective leads 40 to the head slider. In various embodiments, the bond pads 104 may include coatings or outer layers of conductive metal such as, without limitation, gold or nickel.

The flexure 10 also includes a dielectric layer 110 disposed between the leads 40 and the spring metal layer 20. Like the leads 40, the dielectric layer 110 includes backed portions 116 overlaying the spring metal layer 20, and unbacked portions 124 corresponding to and underlying the unbacked portions 96 of the leads 40 disposed in the gap 84. The dielectric layer 110 operates to electrically isolate the spring metal layer 20 from the leads 40. As further shown, the flexure 10 includes a dielectric cover layer 126 disposed over portions of the leads 40. The cover layer 126 functions as a protective coating over the covered lead portions.

The spring metal layer 20, the leads 40, the dielectric layer 110, and the cover layer 126 can be made from any materials known in the art or later developed for comparable structures in head suspension flexures manufactured by any additive process. In one embodiment, the spring metal layer 20 is made substantially from stainless steel. In one embodiment, the dielectric layer 110 and/or the cover layer 126 may be made from a dielectric polymer. In one such embodiment, the dielectric layer 110 and the cover layer 126 are made from photosensitive polyimide. In one embodiment, the conductive leads 40 are made from copper or copper alloys. In other embodiments, all or portions of the leads 40 may be made of noble metals such as gold. In still other embodiments, the leads 40 may have multi-layer structures including layers of different conductive materials. Other materials for the spring metal layer 20, the leads 40, and the dielectric layer 110 will be apparent to those skilled in the art based on the foregoing.

Figure 2:
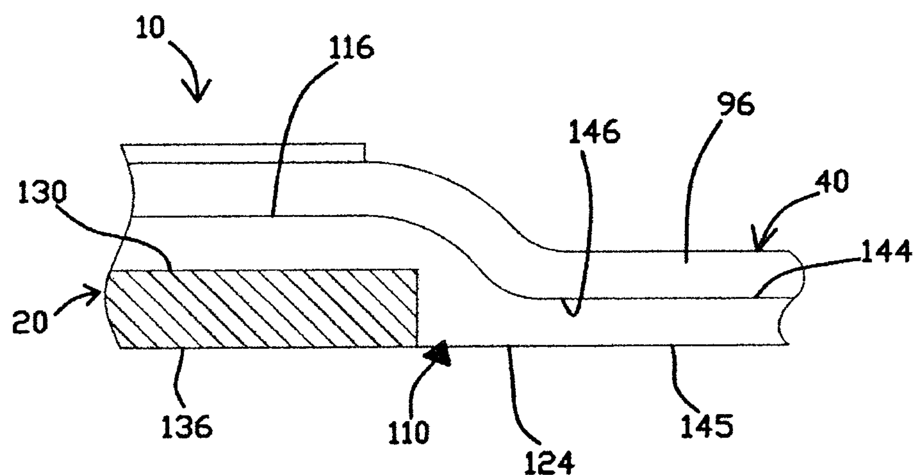
FIG. 2 is a cross-sectional elevation view of a portion of the flexure of FIG. 1 taken at the line 2-2 in FIG. 1.

FIG. 2 is a partial cross-sectional side view of a portion of the flexure 10 taken along the line 2-2 in FIG. 1, showing the relative positions of the spring metal layer 20 and the conductive leads 40. As shown in FIG. 2, the spring metal layer 20 has opposed major surfaces 130 and 136. Additionally, as shown, the backed portion 116 of the dielectric layer 110 is disposed on the major surface 130 of the spring metal layer 20, while the unbacked portion 124 of the dielectric layer 110 is disposed in the gap 84 between the flexure arm 54 and the tongue 70 (see FIG. 1). As illustrated, the dielectric layer 110 includes a first surface 144 and a second surface 145 opposite the first surface 144. In the illustrated embodiment, the first surface 144 of the dielectric layer 110 in the unbacked portion 124 is located between the major surfaces 130, 136 of the spring metal layer 20. In other embodiments, only the second surface 145 of the dielectric layer 10 is located between the major surfaces 130, 136 of the spring metal layer 20. In still other embodiments, both surfaces 144, 145 of the unbacked dielectric portion 116 are positioned between the major surfaces 130, 136 of the spring metal layer 20.

As further shown, the conductive leads 40 are disposed on the first surface 144 of the dielectric layer 110 and each include a lower surface 146 adjacent to and in contact with the dielectric layer first surface 144. Thus, as illustrated, at least the lower surface 146 of the unbacked lead portion 96 is located between the major surfaces 130, 136 of the spring metal layer 20. Accordingly, in the illustrated embodiment, the unbacked lead portion 96 and the spring metal layer 20 are substantially co-planar. In some embodiments, the unbacked portions 96 of the leads 40 are positioned and configured such that they are positioned entirely between the major surfaces 130, 136 of the spring metal layer 20 (i.e., the unbacked portions 96 do not extend above the major surface 130 or below the major surface 136 of the spring metal layer 20).

As a result of the novel lead configuration according to the various embodiments of the present invention, the unbacked portions 96 of the leads 40 are positioned proximate the neutral axis of the spring metal layer 20. This in turn locates the neutral axis of the composite flexure 10 in the region including the unbacked lead portions 96 generally proximate the neutral axis of the spring metal layer 20. This configuration will result in lower bending stresses in the leads 40 as compared to conventional integrated lead flexures in which the leads are positioned substantially above the spring metal layer (i.e., offset from the spring metal layer by at least the thickness of the intervening dielectric layer). It will be appreciated that the unbacked lead and dielectric portions 96, 124 disposed between the flexure arm 58 and the tongue 70 (see FIG. 1) may also be configured as shown in FIG. 2. Additionally, in some embodiments, the unbacked portions of the leads and dielectric layer may extend at least partially outside the flexure arms 54, 58 (i.e., are not disposed between the flexure arms 54, 58 and the tongue 70). In such embodiments, the unbacked portions of the leads and dielectric layers may also be formed to be located substantially inline with the spring metal layer 20 as illustrated in FIG. 2.

Figure 3:
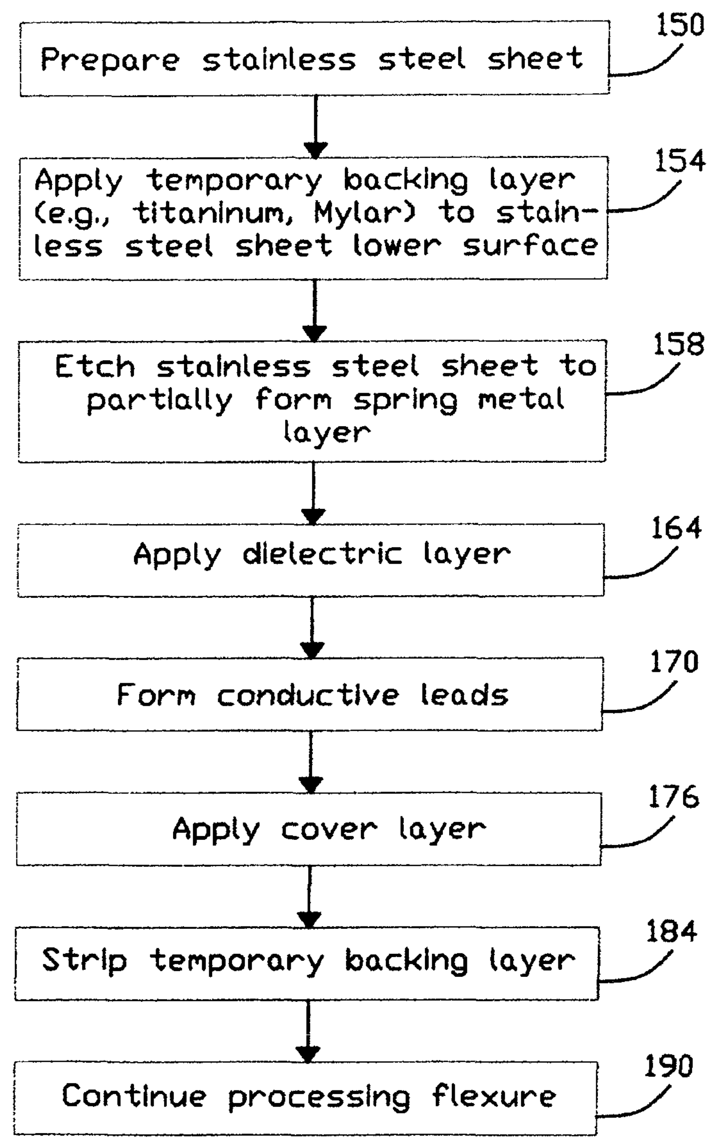
FIG. 3 is a flowchart illustrating a method of manufacturing the flexure of FIG. 1 according to one embodiment of the present invention.

FIG. 3 is a flowchart illustrating a method of manufacturing the flexure 10 according to one embodiment of the present invention. As shown in FIG. 3, initially, a stainless steel sheet is provided and prepared for subsequent processing. (Block 150) Next, a temporary backing layer is applied to a surface of the stainless steel sheet. (Block 154) As explained and illustrated below, the backing layer operates as a platform for formation of the unbacked portions of the leads and dielectric layer. Next, the stainless steel sheet is etched to partially form the flexure spring metal layer and to expose one or more surfaces of the backing layer. (Block 158) The dielectric layer can then be formed on the partially formed spring metal layer, with the portions corresponding to the unbacked dielectric portions deposited on and supported by the surfaces of the backing layer exposed by the preceding etching step. (Block 164) Next, the conductive leads are formed on the flexure. (Block 170) The cover layer can then be applied to the leads as appropriate. (Block 176) The temporary backing layer is then stripped from the spring metal layer to substantially complete the formation of the unbacked lead portions. (Block 184) From there, additional processing steps (e.g., additional stainless steel etching steps) are performed to complete the flexure. (Block 190)

Figure 4:
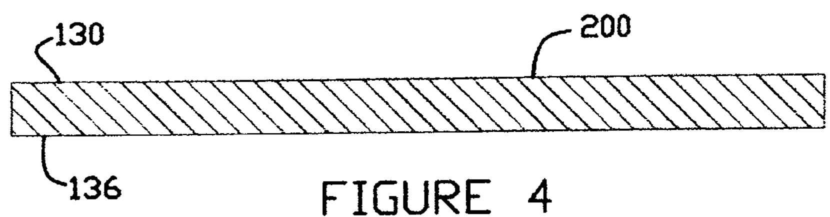
FIGS. 4 through 10 are schematic side cross-sectional views of a portion of the flexure of FIG. 1 illustrating the sequential manufacturing process steps described in FIG. 3.
Figure 5:
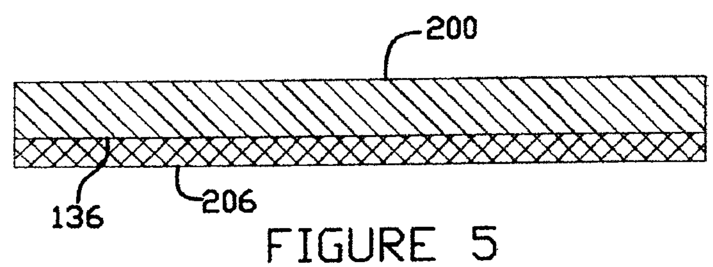

FIGS. 4 through 10 are schematic side cross-sectional views of a portion of the flexure 10 illustrating, schematically, the sequential manufacturing steps set forth in FIG. 3. As shown in FIG. 4, initially, a stainless steel sheet 200 is provided and includes opposed surfaces corresponding to the major surfaces 130, 136 of the spring metal layer 20. Next, as shown in FIG. 5, a backing layer 206 is applied to the major surface 136 of the stainless steel sheet 200. The backing layer 206 provides a temporary platform for subsequent formation of the unbacked portions 124, 96 of the dielectric layer 110 and the leads 40 (see FIG. 2). The backing layer 206 may be made from any material having suitable strength and resistance to etching processes subsequently performed on the stainless steel sheet 200. In one embodiment, the backing layer 206 is a coating made substantially or entirely of titanium or a titanium alloy. In another embodiment, the backing layer 206 may be made from a polyester film such as a Mylar®. The backing layer 206 may be applied to the stainless steel sheet 200 using any suitable method, such as any known lamination process.

Figure 6:
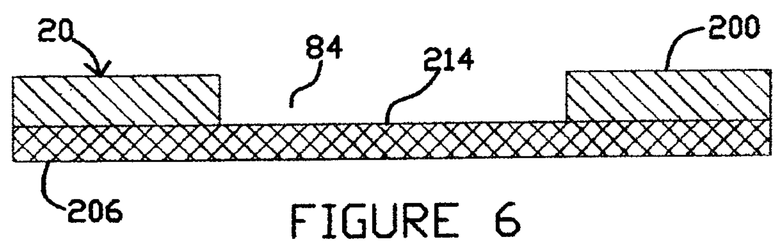

Next, as shown in FIG. 6, an etching process is performed on the stainless steel sheet 200 to partially form the spring metal layer 20, and in particular, to form the gap 84, e.g., as between the flexure arms 54, 58 and the tongue 70 (see FIG. 1). In the illustrated embodiment, a portion of the stainless steel sheet 200 is etched through its entire thickness so as to provide an exposed surface 214 of the underlying backing layer 206 below the gap 84. This etching step can be accomplished using any methods, whether now known or later developed, for forming stainless steel flexure structures by etching. Such methods can include, without limitation, photolithography, ferric chloride-based etching, and the like.

Figure 7:
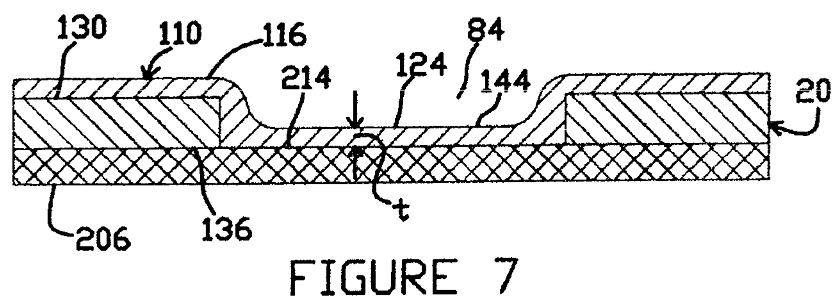

As shown in FIG. 7, the dielectric layer 110 is next formed on the partially formed spring metal layer 20. The dielectric layer 110 can be applied using any techniques now known or later developed for applying dielectric materials to stainless steel. In one embodiment, the dielectric layer 110 is formed on the spring metal layer 20 using a photosensitive polyimide material and known photolithography processes.

As can be seen in FIG. 7, the backed portion 116 of the dielectric layer 110 is disposed on the major surface 130 of the spring metal layer 20, while the unbacked portion 124 of the dielectric layer 110 is disposed in the gap 84 and on the exposed surface 214 of the backing layer 206. As further shown, the unbacked portion 124 is deposited to a thickness t such that its first surface 144 lies between the major surfaces 130, 136 of the spring metal layer 20.

In some embodiments, a seed layer (not shown) may be applied to the first surface 144 of the dielectric layer 110 to facilitate subsequent formation of the leads. When present, the seed layer may be made from conductive material such as chromium or other suitable material, and may be deposited using a vacuum deposition process or other known process to apply seed layer material onto the surface of the flexure structures. In some embodiments, the seed layer is omitted.

Figure 8:
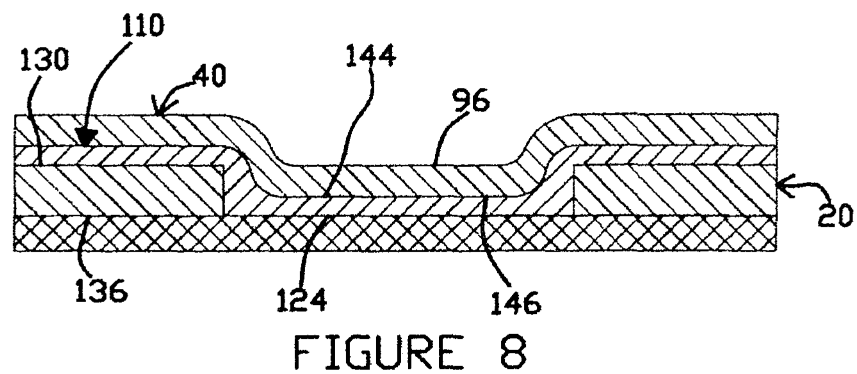

Next, as illustrated in FIG. 8, the conductive leads 40 are applied to the dielectric layer 110. The leads 40 may be applied using any methods, whether now known or later developed, for applying conductive leads to flexures by an additive process. In one exemplary embodiment, the major surface 130 of the spring metal layer 20 and the first surface 144 of the dielectric layer 110, respectively, are masked using photolithography techniques to define the desired pattern for the leads 40. The leads 40 can then be plated to the flexure 10 using conventional electroplating or electroless plating processes, and the mask material can be removed. Other methods for applying the leads 40 to the flexure 10 will apparent to those skilled in the art based on the foregoing.

As shown in FIG. 8, because the unbacked lead portion 96 is deposited on the dielectric layer first surface 144, which in turn is positioned between the major surfaces 130, 136 of the spring metal layer 20, at least the lower surface 146 of the unbacked lead portion 96 is also positioned between the spring metal layer major surfaces 130, 136. As a result, the unbacked lead portion 96 is substantially in line with the general plane of the spring metal layer 20. In the illustrated embodiment, the upper surface of the unbacked lead portion 96 is located above the major surface 130 of the spring metal layer 20. As discussed above, in other embodiments, the thickness t of the unbacked dielectric portion 124 (see FIG. 7) and/or the unbacked lead portion thickness are selected such that the unbacked lead portion 96 can be positioned entirely between the major surfaces 130, 136 of the spring metal layer 20.

Figure 9:
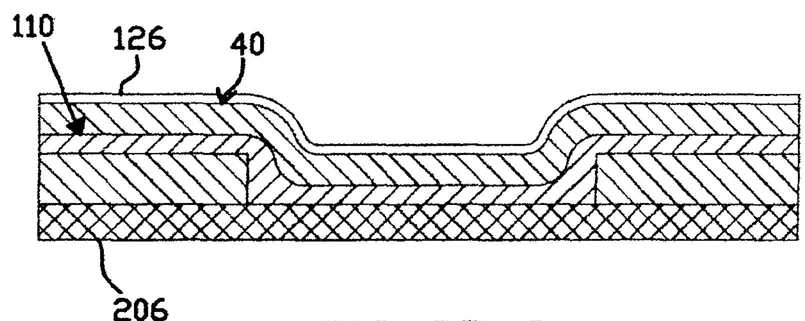

As illustrated in FIG. 9, in the embodiment shown, the dielectric cover layer 126 is then applied over the leads 40. As described above, the cover layer 126 may, in one embodiment, be made from a dielectric material such as photosensitive polyimide, and may be deposited by substantially the same or identical process (e.g., photolithography) used to form the dielectric layer 110. However, any other method, whether now known or later developed, may be used to form the cover layer 126.

Figure 10:
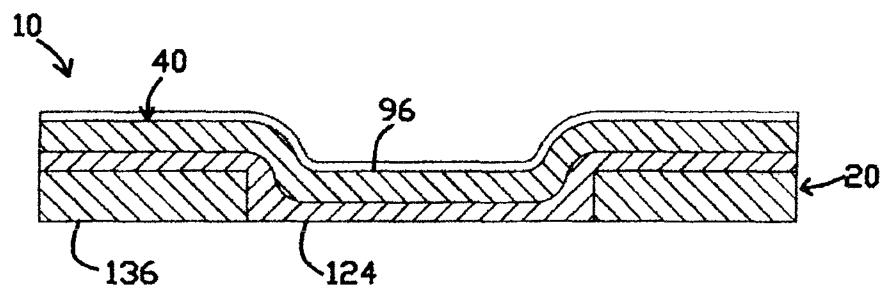

Next, the backing layer is stripped from the major surface 136 of the spring metal layer 20, to substantially complete the formation of the unbacked lead portion 96. FIG. 10 illustrates the flexure 10 after removal of the backing layer 206. The backing layer 206 can be removed using any suitable method, e.g., etching or mechanical means.

After removal of the backing layer 206, fabrication of the flexure 10 can then proceed according to known methods and techniques. For example, additional etching processes can be performed to complete the formation of the tongue 70 and to form additional features in the spring metal layer 20 (see FIG. 1). Additionally, formation of the bond pads 104 can be completed, including, if desired, applying additional conductive metal layers thereon. Other manufacturing processes, such as mechanical forming, can be performed as required.

In one embodiment, an additional processing step may include removal of all or part of the unbacked dielectric portion 124 so as to substantially fully expose the unbacked lead portion 96. In one such embodiment, the unbacked lead portion 96 may further be coated or plated with an additional metallic plating (not shown) or other protective coating. The unbacked dielectric portion 124 may be removed using any suitable process, including without limitation, etching or laser ablation.

Figure 11:
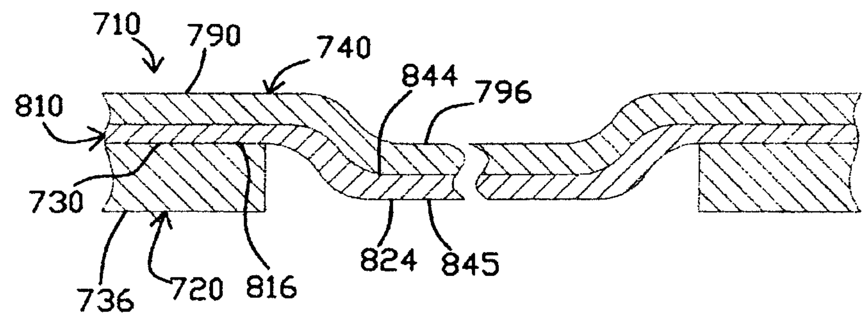
FIG. 11 is a schematic side cross-sectional view of a portion of an integrated lead head suspension flexure according to another embodiment of the present invention.

FIG. 11 is a schematic side cross-sectional view of a portion of an alternative flexure 710 according to another embodiment of the present invention. As shown in FIG. 11, the flexure 710 includes a spring metal layer 720 having a first major surface 730 and a second major surface 736, and at least one conductive lead 740 having a backed portion 790 overlaying the spring metal layer 720 and an unbacked portion 796 not overlaying the spring metal layer 720. As further shown, the flexure 710 includes a dielectric layer 810 having a backed dielectric portion 816, an unbacked dielectric portion 824, a first surface 844 opposite the spring metal layer 720, and a second surface 845 opposite the first surface 844. The conductive lead 840 is disposed on the first surface 844 of the dielectric layer 810.

The flexure 710 is otherwise substantially similar to the flexure 10 above, except that only the second surface 845 of the unbacked dielectric layer portion 824 is positioned between the major surfaces 730, 736 of the spring metal layer 720. Thus, in the illustrated embodiment, the unbacked lead portion 796 is not positioned between the major surfaces 730, 736 of the spring metal layer 720, but is still more closely inline with the spring metal layer 720 than in conventional flexure designs in which the entire dielectric layer is positioned above the spring metal layer. Accordingly, the neutral axis or plane of the unbacked lead portion 796 lies relatively close to the neutral axis of the spring metal layer 720 as compared to such conventional flexure designs. And in turn, as discussed above, the neutral axis of the flexure 710 as a whole is, in the region of the unbacked lead portion 796, also located more proximate the neutral axis of the spring metal layer 720 as compared to such conventional flexures.

The unbacked lead and dielectric portions 796, 824 of the flexure 710 can be manufactured using any suitable method. In one embodiment, the spring metal layer 720 can be etched through its thickness in the area corresponding to the unbacked lead and dielectric portions 796, 824, such that the remaining spring metal layer material operates as a backing layer for the unbacked dielectric layer portion 824. The dielectric layer 810 can then be formed to a substantially uniform thickness, and the conductive lead 740 can be formed on the dielectric layer 810. The remaining portion of the spring metal layer 720 operating as a backing layer can then be etched away to expose the unbacked dielectric portion 824.

In another embodiment, the unbacked lead and dielectric layer portions 796, 824 can be formed by mechanical forming processes. In one such embodiment, the dielectric layer 810 and the conductive lead 740 can be formed on the spring metal layer 720, the region of the spring metal layer 720 underlying the unbacked dielectric and lead portions 824, 796 can be etched away. The unbacked dielectric and lead portions 824, 796 can then be mechanically formed such that at least the second surface 845 of the unbacked dielectric layer 824 is positioned between the major surfaces 730, 736 of the spring metal layer 720. In such an embodiment, the positions of the unbacked dielectric and lead portions 824, 796 relative to the major surfaces 730, 736 of the spring metal layer 720 can be controlled based on the magnitude of the applied mechanical forming force. It will be appreciated that the mechanical forming process just described may, in various embodiments, also be used to form the unbacked lead and dielectric portions 96, 124 of the flexure 10 described above.

Figure 12:
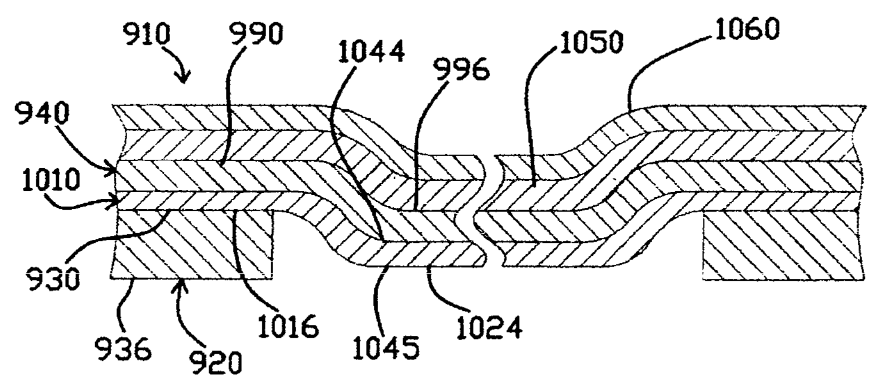
FIG. 12 is a schematic side cross-sectional view of a portion of an integrated lead head suspension flexure according to still another embodiment of the present invention.

FIG. 12 is a schematic side cross-sectional view of a portion of an alternative flexure 910 according to another embodiment of the present invention. As shown in FIG. 12, the flexure 910 includes a spring metal layer 920 having a first major surface 930 and a second major surface 936, and at least one conductive lead 940 having a backed portion 990 overlaying the spring metal layer 920 and an unbacked lead portion 996 not overlaying the spring metal layer 920. As further shown, the flexure 910 includes a dielectric layer 1010 having a backed dielectric portion 1016, an unbacked dielectric portion 1024, a first surface 1044 opposite the spring metal layer 920, and a second surface 1045 opposite the first surface 1044. The conductive lead 1040 is disposed on the first surface 1044 of the dielectric layer 1010. The flexure 910 is otherwise substantially similar to the flexures 10 and/or 710 above, except that the flexure 910 further includes a second dielectric layer 1050 on the conductive lead 940, and a second conductive lead 1060 on the second dielectric layer 1050. The flexure 910 thus has a stacked lead design. In one embodiment, the unbacked dielectric portion 924 may be removed as described above. The flexure 910 can be manufactured using any of the manufacturing methods described above with respect to the flexures 10, and 710, modified to include additional steps for forming the second dielectric layer 1050 and second conductive lead 1060.

In the embodiments described above, at least one surface of the unbacked dielectric lead and/or dielectric portions is positioned between the major surfaces of the spring metal layer. In other embodiments of the present invention, however, one or more unbacked portions of the dielectric layer may be thicker than the spring metal layer. In such embodiments, part of these unbacked dielectric layer portions may be positioned between the major surfaces of the spring metal layer, while the first and second surfaces of the unbacked dielectric portions may be positioned, respectively, above and below the major surfaces of the spring metal layer. Alternatively, in other embodiments, the unbacked lead portions may be thicker than the spring metal layer. In such embodiments, part of the unbacked lead portions may be positioned between the major surfaces of the spring metal layer, while the surfaces of the unbacked lead portions may be positioned above and below the major surfaces of the spring metal layer. In still other embodiments, the unbacked lead or dielectric portions may have substantially the same thickness as the corresponding spring metal layer, and may be positioned with their surfaces substantially inline with the major surfaces of the spring metal layer. In all of the above embodiments, the unbacked lead portions will be positioned more in line with the spring metal layer and, accordingly, more proximate the neutral axis of the spring metal layer than in conventional flexure designs having the unbacked lead and/or dielectric portion positioned solely above the spring metal layer.

In the embodiments illustrated above, the unbacked lead portions are formed in the gimbal region of the flexure. It is emphasized, however, that any lead portions that are unbacked by the spring metal layer of the flexure can be configured to be substantially or fully inline with the spring metal layer, according to the various embodiments of the present invention. For example, in other embodiments, the proximal portions (not shown) of the flexure may also include unbacked lead portions formed in accordance with the embodiments of the present invention described and shown above.

The various embodiments of the present invention offer numerous advantages. As discussed above, locating the unbacked lead portions substantially inline with the spring metal layer reduces stresses in those lead portions. Additionally, this configuration significantly decreases the contribution of the dielectric layer, the leads, and the cover layer to the overall stiffness of the flexure in the gimbal region, and indeed, can decrease the overall stiffness of the flexure in this region. This decrease in the stiffness contribution of the leads and the dielectric layer may also reduce gimbal stiffness variation caused by manufacturing process variations. Still additionally, reducing the overall stiffness of the flexure structure will decrease the magnitude of the stress/strain within the structure during forming, which may in turn decrease cracking and delamination of the dielectric layer and the leads.

Flexures according to the various embodiments of the present invention also exhibit improved stability and adjustability as compared to conventional flexures in which the corresponding lead portions are positioned entirely above the spring metal layer. Additionally, positioning the leads and dielectric layer closer to the neutral axis of the spring metal layer will reduce residual stresses within the flexure structure after static attitude adjustment. The reduction in residual stresses will increase the stability of the adjusted static attitude.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of manufacturing an integrated lead head suspension flexure, the method comprising:

applying a backing layer to a spring metal layer, wherein the spring metal layer has a first surface and a second surface opposite the first surface and the backing layer is applied to the second surface;

etching at least a portion of the spring metal layer to form a gap exposing a surface of the backing layer;

forming a dielectric layer, including:

forming a first dielectric portion on the first surface of the spring metal layer; and forming a second dielectric portion in the gap on the surface of the backing layer such that at least a first surface of the second dielectric portion is disposed between the backing layer and a level of the first surface of the spring metal layer;

forming at least one conductive lead on the dielectric layer, including:

forming a first lead portion on the first dielectric portion; and forming a second lead portion on the first surface of the second dielectric portion; and removing the backing layer.

2. The method of claim 1 wherein applying the backing layer includes coating the second surface of the spring metal layer with a material including titanium or polyester.

3. The method of claim 1 wherein etching the spring metal layer includes etching the spring metal layer to at least partially form a pair of lateral flexure arms and flexure tongue separated from the flexure arms by the gap extending over the exposed surface of the backing layer.

4. The method of claim 3 wherein forming the dielectric layer includes forming the second dielectric portion in a region of the gap between one of the flexure arms and the tongue.

5. The method of claim 4 wherein forming the at least one conductive lead includes forming a plurality of conductive leads, each of the plurality of conductive leads terminating in a magnetic head slider bond pad.

6. The method of claim 5 wherein forming the dielectric layer includes forming the dielectric layer using a photolithography process.

7. The method of claim 6 wherein forming the plurality of conductive leads includes plating the plurality of the conductive leads on the dielectric layer.

8. The method of claim 1 and further comprising removing the second dielectric portion after removing the backing layer.

9. A method of manufacturing an integrated lead head suspension flexure, the method comprising:

forming a spring metal layer having a first surface and a second surface opposite the first surface; and forming at least one conductive lead, including:

forming a first lead portion backed by the spring metal layer; and forming a second lead portion unbacked by the spring metal layer and including a surface having a level located between levels of the first and second surfaces of the spring metal layer.

10. The method of claim 9 and further comprising:

forming a first dielectric portion on the spring metal layer; and forming a second dielectric portion unbacked by the spring metal layer and including a first surface of the second dielectric portion having a level located between levels of the first and second surfaces of the spring metal layer, wherein:

forming the first lead portion includes forming the first lead portion on the first dielectric portion; and forming the second lead portion includes forming the second lead portion on the first surface of the second dielectric portion.

11. The method of claim 9 wherein forming the spring metal layer includes forming a gap in the spring metal layer.

12. The method of claim 11 and further comprising:

forming a dielectric layer on the flexure, including:

forming a first dielectric portion on the spring metal layer; and forming a second dielectric portion in the gap and including a first surface having a level located between levels of the first and second surfaces of the spring metal layer, wherein:

forming the first lead portion includes forming the first lead portion on the first dielectric portion; and forming the second lead portion includes forming the second lead portion on the first surface of the second dielectric portion.

13. The method of claim 12 wherein forming the at least one conductive lead includes plating a plurality of conductive leads on the dielectric layer.

* * * * *